(No Model.) 3 Sheets—Sheet 1.

H. L. FREEMAN.
LAWN MOWER.

No. 541,082. Patented June 18, 1895.

Witnesses
Julius Ulke Jr
J. F. Riley

Inventor
Horace L. Freeman,
By his Attorneys.
C. A. Snow & Co.

(No Model.) 3 Sheets—Sheet 2.

H. L. FREEMAN.
LAWN MOWER.

No. 541,082. Patented June 18, 1895.

Witnesses
Julius Ulke Jr.
H. J. Riley

Inventors
Horace L. Freeman,
By his Attorneys.
C. A. Snow & Co.

(No Model.) 3 Sheets—Sheet 3.

H. L. FREEMAN.
LAWN MOWER.

No. 541,082. Patented June 18, 1895.

Inventor.
Horace L. Freeman,
Witnesses
By his Attorneys.

UNITED STATES PATENT OFFICE.

HORACE L. FREEMAN, OF LEXINGTON, NORTH CAROLINA.

LAWN-MOWER.

SPECIFICATION forming part of Letters Patent No. 541,082, dated June 18, 1895.

Application filed June 9, 1894. Serial No. 514,061. (No model.)

*To all whom it may concern:*

Be it known that I, HORACE L. FREEMAN, a citizen of the United States, residing at Lexington, in the county of Davidson and State of North Carolina, have invented a new and useful Lawn-Mower, of which the following is a specification.

The invention relates to improvements in lawn mowers.

The object of the present invention is to improve the construction of lawn mowers, and to provide a simple and efficient one which will cut equally well high and short grass without liability of clogging, and which will be adapted to cut close to the hedges, fences, and the like, and not require the grass at those points to be subsequently trimmed.

The invention consists in the construction and novel combination and arrangement of parts hereinafter fully described, illustrated in the accompanying drawings, and pointed out in the claim hereto appended.

Figure 1:
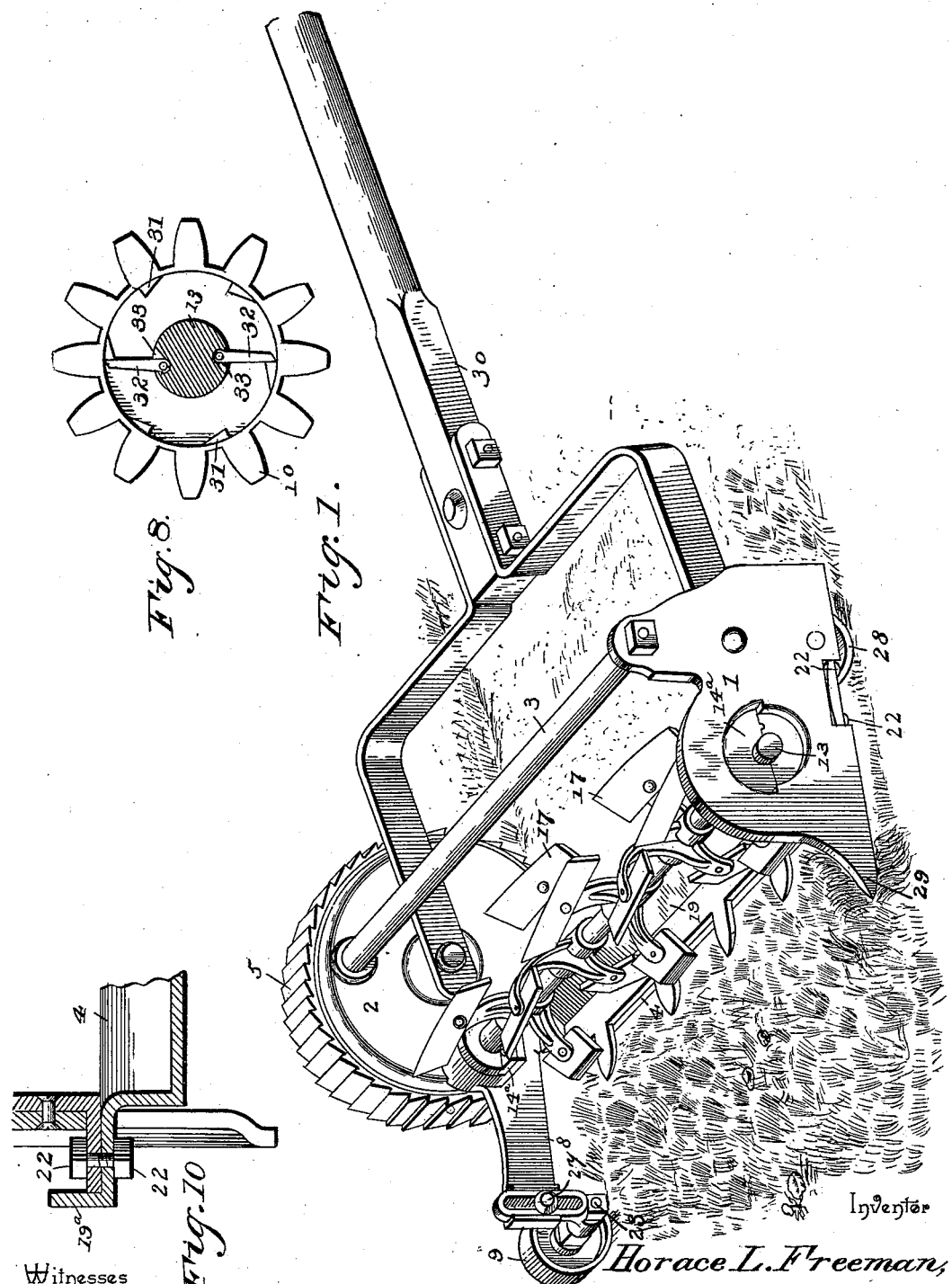
Figure 2:
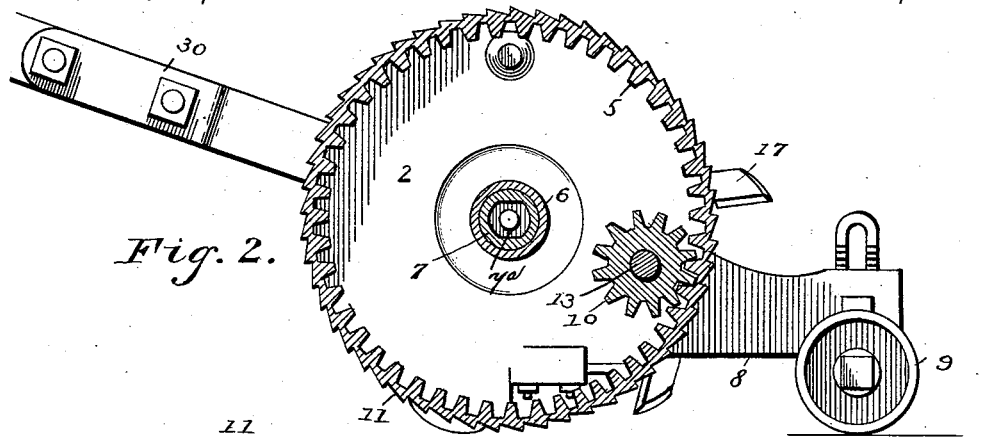
Figure 3:
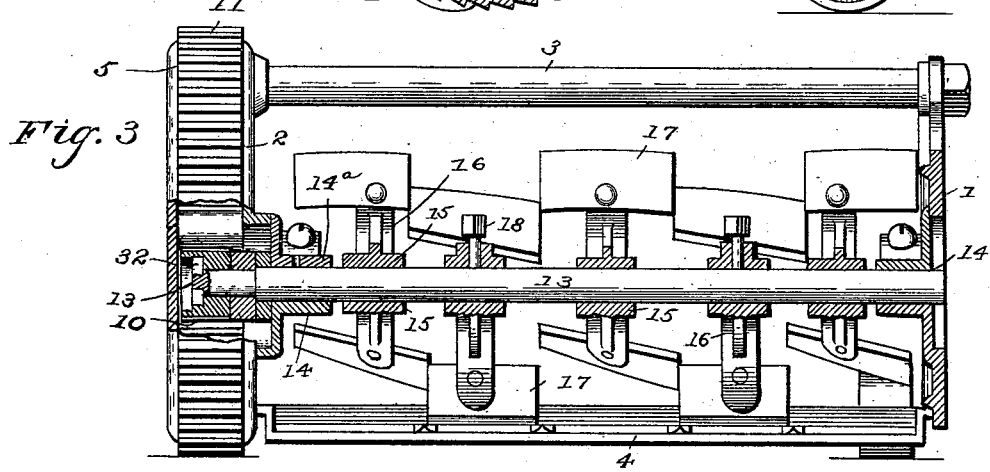
Figure 9:
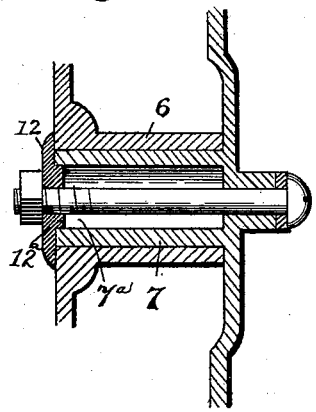
Figure 4:
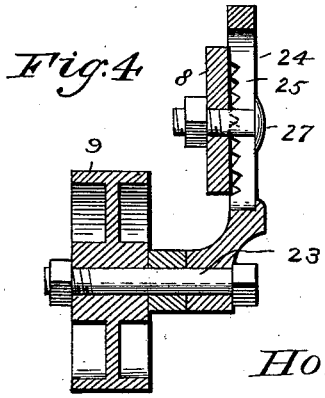
Figure 5:
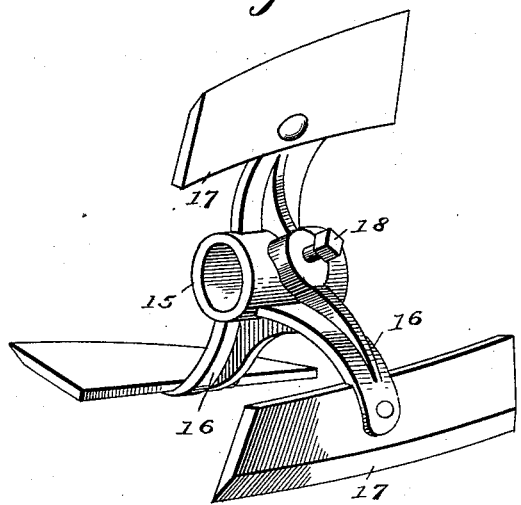
Figure 6:
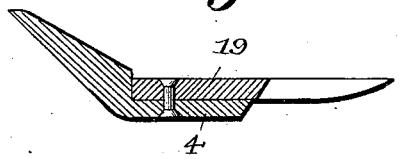
Figure 7:
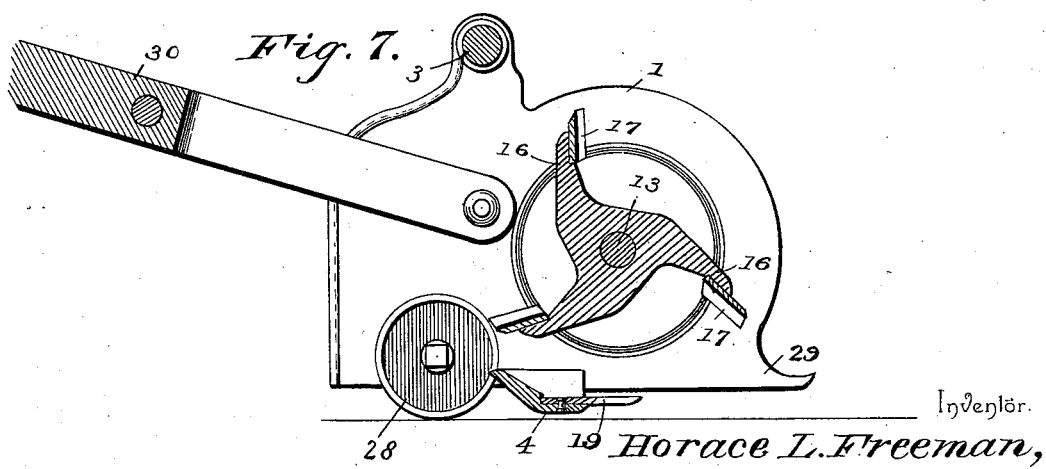

In the drawings, Figure 1 is a perspective view of a lawn-mower constructed in accordance with this invention. Fig. 2 is a vertical longitudinal sectional view, section being taken through the gearing. Fig. 3 is a transverse sectional view. Fig. 4 is a detail sectional view showing the adjustable wheel. Fig. 5 is a detail perspective view of one of the hubs. Fig. 6 is a detail sectional view of the finger-bar. Fig. 7 is a central longitudinal sectional view of the lawn-mower. Fig. 8 is a detail view of the clutch. Fig. 9 is a sectional view illustrating the manner of journaling the internal gear wheel. Fig. 10 is a detail sectional view of one end of the transverse bar.

Like numerals of reference indicate corresponding parts in all the figures of the drawings.

1 and 2 designate sides of a lawn mower frame, which sides are connected at the top by a cross-bar 3, and at the bottom by a transverse bar 4, to which is secured the finger bar of the lawn mower. The side 2 of the lawn mower frame is circular, and conforms to the configuration of, and fits within, an internal gear wheel 5 provided with a central inwardly extending hub 6, which is journaled on a central sleeve 7 formed integral with the circular side 2 of the lawn mower frame. The circular side piece of the lawn mower frame is provided at the front of the machine with an inwardly offset forwardly extending arm 8 to the front end of which is adjustably connected a wheel 9.

The internal gear wheel meshes with a pinion 10, and forms a casing receiving the same, and it is provided with shouldered peripheral teeth 11, adapted to positively engage the ground to form an efficient traction wheel, and to insure a continuous and steady operation of a revolving cutter. The internal gear wheel is secured on the journal sleeve of the side 2 of the lawn mower frame, by means of a bolt, which passes through the said sleeve, and a washer 12 is interposed between the nut of the bolt and the outer face of the internal gear wheel. The washer is rigid with the journal sleeve 7, being provided with an integral boss 12$^a$, which has straight sides and rounded ends to conform to the opening 7$^a$ of the sleeve 7.

The pinion 10 is connected by a clutch to a cutter shaft 13, which is disposed transversely of the lawn mower frame in bearings 14 thereof, said bearings being provided with removable journal plates 14$^a$, to enable the revolving cutter to be readily detached from the lawn mower frame when it is desirable to do so for any purpose whatever.

On the cutter shaft is arranged at intervals a series of independent hubs 15, which are provided with short curved radial arms 16 carrying inclined knives 17, and the arms 16 of each hub are disposed opposite the intervals between the arms of the adjacent hub. Each hub is adjustably and detachably secured to the shaft by a clamping screw 18, and this disposition of knives enables the lawn mower to cut high and short grass with equal facility, and without any liability of long grass clogging the machine, and being passed over uncut.

The cutter shaft carries a number of independent hubs, and each hub has an annular series of radial arms. The radial arms of each hub are located at the intervals between the arms of the adjacent hubs; and the radial arms of the several hubs are disposed in spiral lines across the mower. The blades 17, which are mounted on all of the radial arms, are so short, and are disposed at such an inclination, that when a blade of any one of the radial arms strikes tall grass, the tall spears of grass will be deflected, and will pass behind the short cutter blade, and be in position to be cut by the same. The grass is held against lateral movement on the fixed blade by projections or fingers, which extend forward at intervals from the front edge of the fixed blade.

The finger bar 19 which forms a fixed blade and over which the short blades work is preferably constructed of steel. It has a straight front edge and is provided at intervals with integral forwardly extending fingers or projections, which serve to hold the grass in proper position to be cut by the knives, and which prevent the grass from springing to one side and escaping the cutting action of the knives. The transverse bar 4, on which the finger bar is mounted is provided at one end with a flange 19$^a$, and it has at each end on its upper face an oppositely tapered or beveled surface, and is secured at these points by bolts 22 arranged in pairs, and capable of adjustment to rock the transverse bar, and thereby adjust the finger bar, to preserve it in proper relation with the revolving cutter.

The height of the stubble and the cutting action is regulated by the vertically adjustable wheel 9, which is journaled on a spindle or bolt 23 of a vertically adjustable bar or shank 24, provided with a longitudinal slot 25, and arranged on the inner face of the forwardly extending arm of the mower frame between vertical parallel flanges thereof, and is secured by a bolt 27. The forwardly extending arm, between the vertical flange thereof, is provided with serrations or teeth, and the opposed face of the slotted bar or shank is provided with a series of similar serrations or teeth to interlock with those of the forwardly extending arm, whereby the front wheel is securely clamped at any desired adjustment.

The opposite side of the lawn mower frame is supported by a rear wheel 28, journaled on a stub shaft or bolt, projecting inward from the side 1 of the frame, in rear of the cutting apparatus, in order not to interfere with the vertical adjustment of the latter by means of the front wheel.

The side plate 1 has a flat, smooth, outer face, and is provided with a forwardly projecting point 29, and it is adapted to form a guide for the cutting apparatus to enable the lawn mower to operate close to a hedge, a wall, or a building, and to cut the grass so as not to require subsequent trimming.

The lawn mower is provided with a suitable handle 30, by means of which it is moved over the grass to be cut. It operates as it is moved forward, and ceases to operate as it moves rearward. This is accomplished by the clutch, which consists of beveled teeth 31 located within and formed integral with the pinion 10, and pawls 32. The pawls are pivotally mounted at their inner ends in recesses or sockets 33 of the shaft 13; and these sockets 33 are shouldered at one side to form stops for the pawls. When the mower is moved rearward the pawl permits the beveled teeth to pass it, but when moving forward the pawls engage the shouldered ends of the teeth and rotate the shaft.

It will be seen that the lawn mower is simple and comparatively inexpensive in construction, that it is positive and reliable in operation, and that it is capable of efficiently cutting with equal facility either high or short grass. It will also be apparent that it is adapted to cut closely to walls, fences, hedges, buildings, and the like, so as not to require grass to be subsequently trimmed.

Changes in the form, proportion, and the minor details of construction may be resorted to without departing from the principle or sacrificing any of the advantages of this invention.

What I claim is—

In a lawn mower, the combination of a frame, a shaft journaled thereon, gearing for rotating the shaft, a number of independent hubs fixed to the shaft, and each provided with an annular series of radial arms, the arms of each hub being located at the intervals between the arms of the adjacent hubs, and the arms of the several hubs being disposed in spiral lines across the mower, the substantially rectangular short blades 17 sharpened only at their front edges and secured intermediate of their ends to the outer terminals of all of the arms and disposed at intervals in spiral lines across the mower, said blades 17 being arranged at a slight inclination, whereby when a blade strikes tall grass the tall spears of grass will be deflected and will pass behind the short cutter blade in position to be struck by the same, and a fixed blade over which the short blades work, provided at intervals with forwardly extending fingers, projecting from the cutting edge of the fixed blade, to hold the grass in position to be operated on by the short blades, substantially as described.

In testimony that I claim the foregoing as my own I have hereto affixed my signature in the presence of two witnesses.

HORACE L. FREEMAN.

Witnesses:
W. H. MOFFITT,
D. C. MOFFITT.